United States Patent
Bates et al.

(10) Patent No.: US 8,656,350 B2
(45) Date of Patent: Feb. 18, 2014

(54) EVENT-BASED PROCESS CONFIGURATION

(75) Inventors: John Bates, Nashua, NH (US); Gareth Smith, Cambridge (GB); Richard M. Bentley, Essex (GB)

(73) Assignee: Software AG (DE)

( * ) Notice: Subject to any disclaimer, the term of this patent is extended or adjusted under 35 U.S.C. 154(b) by 1218 days.

(21) Appl. No.: 12/025,578

(22) Filed: Feb. 4, 2008

(65) Prior Publication Data

US 2008/0196006 A1     Aug. 14, 2008

Related U.S. Application Data

(60) Provisional application No. 60/888,495, filed on Feb. 6, 2007, provisional application No. 60/896,266, filed on Mar. 21, 2007.

(51) Int. Cl.
    *G06F 9/44* (2006.01)

(52) U.S. Cl.
    USPC ........... 717/109; 717/106; 717/110; 717/114; 717/136; 717/137; 715/765

(58) Field of Classification Search
    None
    See application file for complete search history.

(56) References Cited

U.S. PATENT DOCUMENTS

| | | | |
|---|---|---|---|
| 5,245,616 A | 9/1993 | Olson | |
| 5,392,398 A | 2/1995 | Meyer | |
| 5,596,720 A | 1/1997 | Hamada et al. | |
| 5,758,354 A | 5/1998 | Huang et al. | |
| 5,765,033 A | 6/1998 | Miloslavsky | |
| 5,774,729 A * | 6/1998 | Carney et al. | 717/126 |
| 5,801,687 A * | 9/1998 | Peterson et al. | 715/201 |
| 5,805,825 A | 9/1998 | Danneels et al. | |
| 5,822,526 A | 10/1998 | Waskiewicz | |
| 5,850,525 A | 12/1998 | Kalkunte et al. | |
| 5,857,201 A | 1/1999 | Wright, Jr. et al. | |
| 5,870,605 A | 2/1999 | Bracho et al. | |
| 5,878,056 A | 3/1999 | Black et al. | |
| 5,951,648 A | 9/1999 | Kailash | |
| 6,016,515 A | 1/2000 | Shaw et al. | |
| 6,061,559 A | 5/2000 | Eriksson et al. | |
| 6,112,323 A | 8/2000 | Meizlik et al. | |
| 6,128,646 A | 10/2000 | Miloslavsky | |
| 6,145,781 A | 11/2000 | Kawabe et al. | |

(Continued)

OTHER PUBLICATIONS

Title: In Touch: a graphical user interface development tool, P, Rosner et al, source: IEEE, dated: 1990.*

(Continued)

*Primary Examiner* — Chameli Das
(74) *Attorney, Agent, or Firm* — Wilmer Cutler; Pickering Hale and Dorr LLP

(57) ABSTRACT

A system and method for configuring an event-based process are disclosed. A configuration module receives input describing an event-based process or modifications to an event-based process. For example, the configuration module receives as input a graphical depiction of one or more states and state transitions that comprise at least a portion of the event-based process. Using the received input description, the configuration module generates executable data, such as data formatted as an event processing language, corresponding to the input. The executable data is then communicated to an event engine which executes the executable data to implement the event-based process or modifications to an event-based process corresponding to the received input. One or more aspects of the execution of the event-based process may also be visualized, and graphically modified, though an event monitoring module.

26 Claims, 10 Drawing Sheets

(56) References Cited

U.S. PATENT DOCUMENTS

| | | | |
|---|---|---|---|
| 6,167,445 A | 12/2000 | Gai et al. | |
| 6,289,212 B1 | 9/2001 | Stein et al. | |
| 6,298,455 B1 | 10/2001 | Knapman et al. | |
| 6,336,119 B1 | 1/2002 | Banavar et al. | |
| 6,359,635 B1 | 3/2002 | Perttunen | |
| 6,397,352 B1 | 5/2002 | Chandrasekaran et al. | |
| 6,452,934 B1 | 9/2002 | Nakata | |
| 6,453,346 B1 | 9/2002 | Garg et al. | |
| 6,484,198 B1 | 11/2002 | Milovanovic et al. | |
| 6,513,154 B1 | 1/2003 | Porterfield | |
| 6,643,682 B1 | 11/2003 | Todd et al. | |
| 6,647,544 B1 | 11/2003 | Ryman et al. | |
| 6,728,715 B1 | 4/2004 | Astley et al. | |
| 6,732,175 B1 | 5/2004 | Abjanic | |
| 6,782,386 B1 | 8/2004 | Gebauer | |
| 6,792,460 B2 | 9/2004 | Oulu et al. | |
| 6,801,604 B2 | 10/2004 | Maes et al. | |
| 6,807,636 B2 | 10/2004 | Hartman et al. | |
| 6,816,898 B1 | 11/2004 | Scarpelli et al. | |
| 6,823,524 B1 * | 11/2004 | Hewett | 719/318 |
| 6,854,088 B2 | 2/2005 | Massengale et al. | |
| 6,898,556 B2 | 5/2005 | Smocha et al. | |
| 6,901,447 B2 | 5/2005 | Koo et al. | |
| 6,944,662 B2 | 9/2005 | Devine et al. | |
| 6,983,479 B1 | 1/2006 | Salas et al. | |
| 7,007,278 B2 | 2/2006 | Gungabeesoon | |
| 7,028,089 B2 | 4/2006 | Agarwalla et al. | |
| 7,039,701 B2 | 5/2006 | Wesley | |
| 7,096,263 B2 | 8/2006 | Leighton et al. | |
| 7,103,054 B2 | 9/2006 | Novaes | |
| 7,171,628 B1 | 1/2007 | Perttunen | |
| 7,177,929 B2 | 2/2007 | Burbeck et al. | |
| 7,251,689 B2 | 7/2007 | Wesley | |
| 7,287,097 B1 | 10/2007 | Friend et al. | |
| 7,302,634 B2 | 11/2007 | Lucovsky et al. | |
| 7,334,022 B2 | 2/2008 | Nishimura et al. | |
| 7,337,102 B2 * | 2/2008 | Mosterman | 703/21 |
| 7,359,919 B2 | 4/2008 | Cohen et al. | |
| 7,379,971 B2 | 5/2008 | Miller et al. | |
| 7,386,630 B2 | 6/2008 | Liong et al. | |
| 7,395,349 B1 | 7/2008 | Szabo et al. | |
| 7,406,440 B2 | 7/2008 | Napier et al. | |
| 7,406,537 B2 | 7/2008 | Cullen | |
| 7,418,501 B2 | 8/2008 | Davis et al. | |
| 7,433,835 B2 | 10/2008 | Frederick et al. | |
| 7,464,154 B2 | 12/2008 | Dick et al. | |
| 7,467,196 B2 | 12/2008 | Di Luoffo et al. | |
| 7,487,510 B1 | 2/2009 | Carr | |
| 7,496,637 B2 | 2/2009 | Han et al. | |
| 7,512,957 B2 | 3/2009 | Cohen et al. | |
| 7,516,191 B2 | 4/2009 | Brouk et al. | |
| 7,533,172 B2 | 5/2009 | Traversat et al. | |
| 7,539,656 B2 | 5/2009 | Fratkina et al. | |
| 7,543,280 B2 | 6/2009 | Rosenthal et al. | |
| 7,603,358 B1 | 10/2009 | Anderson et al. | |
| 7,702,636 B1 | 4/2010 | Sholtis et al. | |
| 7,747,980 B2 * | 6/2010 | Illowsky et al. | 717/107 |
| 7,752,604 B2 | 7/2010 | Genkin et al. | |
| 7,761,847 B2 * | 7/2010 | Kornerup et al. | 717/113 |
| 7,801,946 B2 | 9/2010 | Bearman | |
| 7,801,976 B2 | 9/2010 | Hodges et al. | |
| 7,802,229 B2 * | 9/2010 | Kornerup et al. | 717/109 |
| 7,881,992 B1 | 2/2011 | Seaman et al. | |
| 7,887,511 B2 | 2/2011 | Mernoe et al. | |
| 7,895,262 B2 | 2/2011 | Nielsen et al. | |
| 7,941,542 B2 | 5/2011 | Broda et al. | |
| 7,992,102 B1 | 8/2011 | De Angelo | |
| 8,001,232 B1 | 8/2011 | Saulpaugh et al. | |
| 8,060,553 B2 | 11/2011 | Mamou et al. | |
| 2001/0007993 A1 | 7/2001 | Wu | |
| 2002/0010781 A1 | 1/2002 | Tuatini | |
| 2002/0026473 A1 | 2/2002 | Gourraud | |
| 2002/0091874 A1 * | 7/2002 | Jones et al. | 709/330 |
| 2002/0107992 A1 | 8/2002 | Osbourne et al. | |
| 2002/0161826 A1 | 10/2002 | Arteaga et al. | |
| 2002/0165745 A1 * | 11/2002 | Greene et al. | 705/7 |
| 2002/0166000 A1 * | 11/2002 | Rossi et al. | 709/328 |
| 2003/0005174 A1 | 1/2003 | Coffman et al. | |
| 2003/0014733 A1 | 1/2003 | Ringseth et al. | |
| 2003/0041178 A1 | 2/2003 | Brouk et al. | |
| 2003/0055920 A1 | 3/2003 | Kakadia et al. | |
| 2003/0061404 A1 | 3/2003 | Atwal et al. | |
| 2003/0074579 A1 | 4/2003 | Della-Libera et al. | |
| 2003/0093500 A1 | 5/2003 | Khodabakchian et al. | |
| 2003/0101210 A1 | 5/2003 | Goodman et al. | |
| 2003/0106039 A1 | 6/2003 | Rosnow et al. | |
| 2003/0120665 A1 | 6/2003 | Fox et al. | |
| 2003/0145281 A1 | 7/2003 | Thames et al. | |
| 2003/0172368 A1 | 9/2003 | Alumbaugh et al. | |
| 2003/0204644 A1 | 10/2003 | Vincent et al. | |
| 2004/0030947 A1 | 2/2004 | Aghili et al. | |
| 2004/0054770 A1 * | 3/2004 | Touboul | 709/223 |
| 2004/0088140 A1 | 5/2004 | O'Konski et al. | |
| 2004/0128353 A1 * | 7/2004 | Goodman et al. | 709/204 |
| 2004/0133633 A1 | 7/2004 | Fearnley et al. | |
| 2004/0177160 A1 * | 9/2004 | Seto et al. | 709/246 |
| 2004/0186817 A1 | 9/2004 | Thames et al. | |
| 2004/0193703 A1 | 9/2004 | Loewy et al. | |
| 2004/0210819 A1 * | 10/2004 | Alonso | 715/500 |
| 2004/0216127 A1 | 10/2004 | Datta et al. | |
| 2004/0225724 A1 | 11/2004 | Pavlik et al. | |
| 2005/0027853 A1 | 2/2005 | Martin et al. | |
| 2005/0038708 A1 | 2/2005 | Wu | |
| 2005/0055695 A1 * | 3/2005 | Law et al. | 718/100 |
| 2005/0097480 A1 | 5/2005 | Care | |
| 2005/0289508 A1 * | 12/2005 | Illowsky et al. | 717/106 |
| 2006/0031481 A1 | 2/2006 | Patrick et al. | |
| 2006/0041461 A1 | 2/2006 | Vucina et al. | |
| 2006/0041859 A1 * | 2/2006 | Vrancic et al. | 717/105 |
| 2006/0069603 A1 | 3/2006 | Williams et al. | |
| 2006/0074732 A1 * | 4/2006 | Shukla et al. | 705/8 |
| 2006/0173985 A1 | 8/2006 | Moore | |
| 2006/0195819 A1 | 8/2006 | Chory et al. | |
| 2006/0206440 A1 | 9/2006 | Anderson et al. | |
| 2006/0224702 A1 | 10/2006 | Schmidt et al. | |
| 2006/0224750 A1 | 10/2006 | Davies et al. | |
| 2006/0230432 A1 | 10/2006 | Lee et al. | |
| 2006/0235548 A1 * | 10/2006 | Gaudette | 700/83 |
| 2006/0294499 A1 * | 12/2006 | Shim | 717/107 |
| 2007/0174393 A1 | 7/2007 | Bosschaert et al. | |
| 2007/0192678 A1 | 8/2007 | Tang et al. | |
| 2007/0266329 A1 * | 11/2007 | Gaudette | 715/763 |
| 2007/0268300 A1 | 11/2007 | Jin et al. | |
| 2008/0004856 A1 * | 1/2008 | Avitzur et al. | 703/17 |
| 2008/0046861 A1 | 2/2008 | Grieser | |
| 2008/0059220 A1 | 3/2008 | Roth et al. | |
| 2008/0120574 A1 | 5/2008 | Heredia et al. | |
| 2008/0120593 A1 | 5/2008 | Keren et al. | |
| 2008/0126932 A1 | 5/2008 | Elad et al. | |
| 2008/0127052 A1 | 5/2008 | Rostoker | |
| 2008/0141237 A1 | 6/2008 | Elad et al. | |
| 2008/0148346 A1 | 6/2008 | Gill et al. | |
| 2008/0163164 A1 | 7/2008 | Chowdhary et al. | |
| 2008/0172270 A1 | 7/2008 | Eckenroth | |
| 2008/0307369 A1 | 12/2008 | Liu et al. | |
| 2009/0262131 A1 | 10/2009 | Suntinger et al. | |
| 2009/0276771 A1 | 11/2009 | Nickolov et al. | |
| 2009/0319832 A1 | 12/2009 | Zhang et al. | |
| 2009/0326997 A1 | 12/2009 | Becker et al. | |
| 2010/0017853 A1 | 1/2010 | Readshaw | |
| 2010/0030718 A1 | 2/2010 | Anderson et al. | |
| 2010/0241409 A1 * | 9/2010 | Ciolfi et al. | 703/6 |
| 2010/0304992 A1 | 12/2010 | An et al. | |
| 2011/0270418 A1 * | 11/2011 | Law et al. | 700/12 |

OTHER PUBLICATIONS

PCT International Search Report and Written Opinion, PCT/US08/52928, Jul. 25, 2008, 8 pages.

Progress Software, Apama Event Modeler v2.0 Professional Edition & Client Edition, Published Apr. 1, 2005 (selected pages, United Kingdom of Great Britain (13 pages).

* cited by examiner

EVENT-BASED PROCESS CONFIGURATION

CROSS REFERENCE TO RELATED APPLICATIONS

This application claims priority under 35 U.S.C. §119(e) from U.S. Provisional Application No. 60/888,495, titled "A Technique And Process To Develop And Deploy Event-Driven Architectures, Using-Direct Manipulation Tools," filed Feb. 6, 2007, and U.S. Provisional Application No. 60/896,266, titled "A Process For The Graphical Modeling, Construction And Deployment Of Complex Event Processing Business Activity Monitoring Processes," filed Mar. 21, 2007, which are incorporated by reference herein in their entirety.

BACKGROUND

1. Field of Art

The present invention generally relates to the field of event-based computer systems, and more specifically, to managing and configuring complex event processing (CEP) applications.

2. Description of the Related Art

Recently, the availability and amount of real-time information has significantly increased. This allows businesses to monitor events in real time and to automatically respond, with minimal latency, when certain events or conditions, such as threats or business opportunities, arise. However, conventional computer systems, such as database systems, are not designed for such real-time event monitoring, analysis and response. Although conventional sequential programming languages, such as C++ or Java™ allow construction of customized systems for event detection and response, constructing such an event-based system or process is time-intensive and the inherent sequential nature of such programming languages is not suitable for various types of real-time event monitoring, analysis and response.

An event-based process or system is any routine or program for processing events such as for identifying meaningful events, detecting patterns of events, event correlation and abstraction, determining event hierarchies, detecting relationships between events or for any other purpose. Event-based computing systems allow real-time monitoring, analysis and response to various types of events. In event-based systems, incoming events are monitored for pre-defined patterns and defined actions are taken when a pattern is detected. Hence, these event-based systems support applications requiring proactive responses to patterns in changing data, such as real-time algorithmic trading, risk, compliance, telecommunications, digital battlefield applications, terrorist tracking, supply chain monitoring and logistics.

Additionally, business activity monitoring (BAM) techniques allow visualization of event patterns detected by an event-based process or computing system, thereby providing real-time insights into an event flow. For example, event-based computing using BAM techniques allows hedge funds to monitor trades, logistics operators to monitor locations and delays in a shipment, and surveillance personnel to detect fraudulent behavior at different devices.

However, there are no standard development tools and techniques for creating and deploying event-based BAM applications. Conventional development methods require use of a bespoke-based method, resulting in a long development cycle and a difficult to maintain system. Conventional development techniques also cannot uniformly abstract multiple applications or scenario types, distinguish between different input parameters and support streaming output parameters.

SUMMARY

One embodiment of a disclosed system and method configures an event-based process using a configuration module. In an embodiment, the configuration module receives input, such as a graphical diagram describing an event-based process. The configuration module then generates executable data describing the event-based process from the received input. For example, the configuration module converts the graphical diagram into executable data in an event-driven programming language for implementation and execution by an event engine. In one embodiment, the executable data is communicated to an event engine that uses the executable data to execute the event-based process.

In one embodiment, the configuration module comprises an editing and modeling module for receiving input, such as graphical data, describing the event-based process. A generation module is adapted to communicate with the editing and modeling module and generates executable data from the received input. In one embodiment, the generated executable data is stored in a storage module for subsequent retrieval of the generated executable data. For example, the storage module allows retrieval and re-use of previously generated or modified event-based process.

In an embodiment, an input describing the event-based process is received. For example, a graphical model describing at least one state transition and transition rules is received. The use of a graphical model allows graphical description and graphical manipulation of the event-based process or modifications to an event-based process. Executable data representing the event-based process is then generated from the received input. For example, the received graphical model is converted into textual data formatted in an event processing language format. The present invention advantageously automatically generates the executable data corresponding from the graphical description. The executable data is then executed to implement the event-based process which then receives input events and generates actions responsive to the received input events.

The features and advantages described in the specification are not all inclusive and, in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Figure 1:
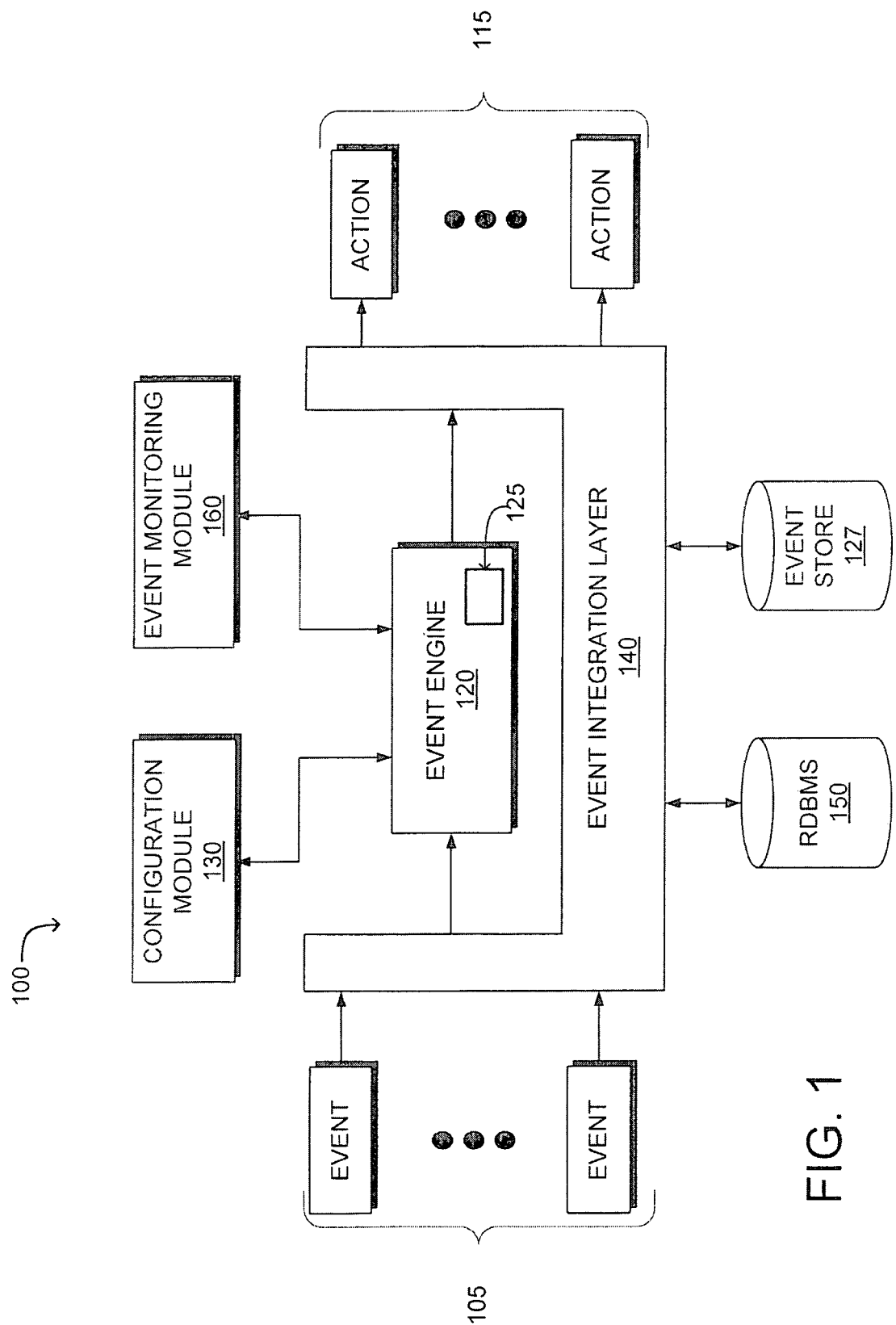
FIG. 1 is a block diagram of a distributed computing system for event processing according to one embodiment of the invention.

A system and method for configuring an event-based process, such as generating an event-based process or modifying an event-based process responsive to an input, are described. For purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

System Architecture

FIG. 1 is a block diagram of a distributed computing system 100 for event processing according to one embodiment of the invention. The distributed computing system 100 comprises an event engine 120 having a rule store 125 and a configuration module 130. In one embodiment, the distributed computing system 100 also comprises an event integration layer 140 coupled to communicate with the event engine 120, an event store 127, a relational database management system (RDBMS) 150 and other computing devices (not shown) that provide input events 105 and receive actions 115. The event engine 120 is also coupled for communication with the configuration module 130 and an event monitoring module 160.

The event engine 120 receives input events 105 from one or more sources, such as computing devices, and generates actions 115 as output. The event engine 120 uses an event-based process to determine an action 115 to perform responsive to an input event 105. The event engine 120 includes the rule store 125 with one or more event processing rules which are applied to received input events 105. Application of the event processing rules generates one or more actions 115 responsive to a received input event 105. In one embodiment, the rule store 125 also includes one or more states corresponding to evaluations of input events 105. Additionally, the event engine 120 receives input from the configuration module 130 and modifies the contents of the rule store 125, such as the event processing rules or the states, accordingly. For example, responsive to input from the configuration module 130, the event engine 120 adds additional states to the event-based process, modifies existing states of the event-based process, modifies event processing rules, adds additional event processing rules or performs similar actions.

In one embodiment, the event engine 120 receives input events 105 from one or more computing devices (not shown) that include computing capabilities and data communication capabilities. Multiple computing devices are used to allow the distributed computing system 100 to process multiple input events 105 and generate multiple actions 115. For example, different computing devices transmit different input events 105 and receive different actions 115. The input events 105 received by the event engine 120 describe occurrences, such as an inventory level, a shipping delay or similar occurrence, or responses to detecting an event, such as invoking a service, notifying a user, initiating a process or other similar action.

In one embodiment, input events 105 are transmitted to the event engine 120 using a data packet including an event header and an event body. The event header comprises an event identifier, an event type, an event name, a time stamp and an event occurrence number. The event body comprises data describing the occurrence, for example, a description of a product having sales below a threshold.

The event engine 120 can be implemented in many ways. For example, it is a software process executable by a processor (not shown) and/or a firmware application. The process and/or firmware is configured to operate on a general purpose microprocessor or controller, a field programmable gate array (FPGA), an application specific integrated circuit (ASIC) or a combination thereof. Alternatively, the event engine 120 comprises a processor that has any one of various computing architectures including a complex instruction set computer (CISC) architecture, a reduced instruction set computer (RISC) architecture or an architecture implementing a combination of instruction sets. The event engine 120 can comprise a single processor or multiple processors. Alternatively, the event engine 120 comprises multiple software or firmware processes running on a general purpose computer hardware device. For purposes of illustration, FIG. 1 shows the distributed computing system 100 as having a single event engine 120; however, in various alternate embodiments, the distributed computing system 100 includes a plurality of event engines with the plurality of event engines adapted for communication with the configuration module 130 and the event monitoring module 160. Thus any one of the configuration module 130 and the event monitoring module 160 can cooperate with and perform its operations with multiple event engines.

In one embodiment, the rule store 125 comprises a non-volatile storage device, such as a hard disk drive, a flash memory device or other persistent storage device. Alternatively, the rule store 125 comprises a volatile storage device such as dynamic random access memory (DRAM), static random access memory (SRAM) or another suitable memory device. In another embodiment, the rule store 125 comprises a combination of a non-volatile storage device and a volatile storage device.

Figure 6:
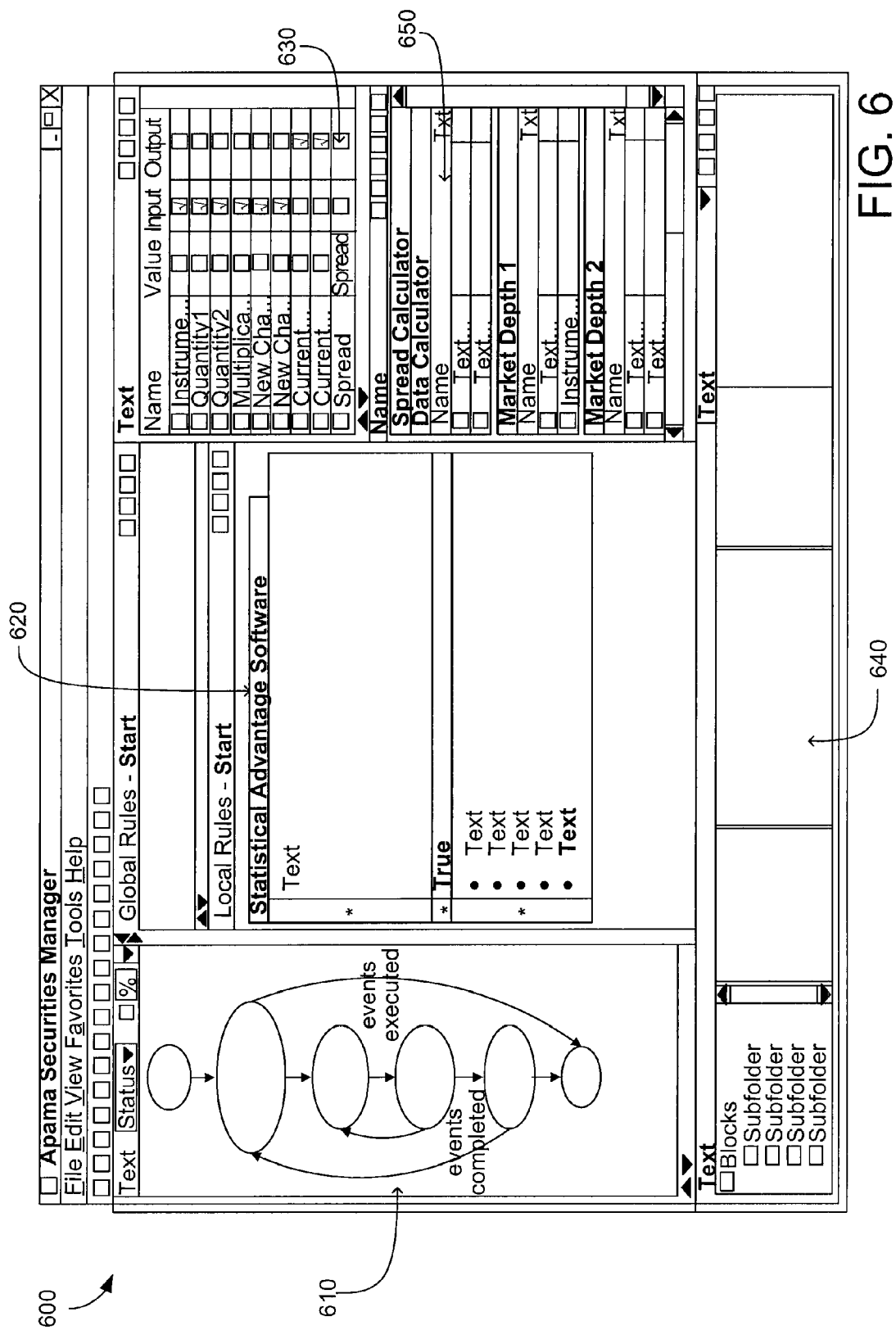
FIG. 6 is a graphical representation of an example user interface for configuring an event-driven process according to one embodiment of the invention.
Figure 10:
FIG. 10 is a graphical representation of an example graphical modeling environment generated by a configuration module.

The configuration module 130 includes computing capabilities and data communication capabilities. The configuration module 130 receives input and generates configuration data for modifying the event-based process. The configuration module 130 then transmits the configuration data (instructions or information) to the event engine 120 to modify the event-based process based on the configuration data. In one embodiment, the configuration module 130 also reformats the received input from a first format to a second format before including it as configuration data. For example, the configuration module 130 receives as input a graphical model describing one or more states of the event-based process and generates textual data formatted in an event processing language corresponding to the received graphical model. This allows a user to describe the event-based process in a simple, intuitive format that is converted into executable data for implementation by the event engine 120. Graphical representations of an example graphical modeling environment 600, 1000 generated by the configuration module 130 are shown in FIGS. 6 and 10.

In one embodiment, the distributed computing system 100 also includes an event integration layer 140. The event integration layer 140 receives events 105 from one or more sources, such as computing devices, and receives one or more actions 115 from the event engine 120 and outputs them to other computing devices (not shown). The event integration layer 140 modifies the format(s) of the events 105 and/or actions 115, allowing a single output format from the event engine 120 to be reformatted for use by different computing devices that receive the actions 115. Similarly, the event integration layer 140 reformats received events 105 allowing the event engine 120 to receive data in a consistent format, regardless of the format in which events 105 are received by the event integration layer 140. In various embodiments, the event integration layer 140 comprises one or more software or firmware processes running on a general purpose computer hardware device. In an alternate embodiment, the computing devices providing events 105 and receiving actions 115 are coupled to the event engine 120 without need for the event integration layer 140.

In an embodiment, the distributed computing system 100 also includes an event store 127 which stores received events 105 and/or actions 115. In an embodiment, the event store 127 communicates with the event integration layer 140 to capture events 105 and actions 115. The event store 127 also communicates with the event engine 120, allowing the event store 127 to communicate stored events to the event engine 120 and thereby use those stored events to simulate or analyze performance of the event engine 120. In an embodiment, the event store 127 stores the captured events 105 in a database or other structured format to expedite subsequent retrieval of the stored events.

In one embodiment, the event store 127 comprises a non-volatile storage device, such as a hard disk drive, a flash memory device or other persistent storage device. Alternatively, the event store 127 comprises a volatile storage device such as dynamic random access memory (DRAM), static random access memory (SRAM) or another suitable memory device. In another embodiment, the event store 127 comprises a combination of a non-volatile storage device and a volatile storage device.

In an embodiment, the distributed computing system 100 also includes a Relational Database Management System (RDBMS) 150 which communicates with the event store 127 either directly or via the event integration layer 140. The RDBMS 150 manages and maintains data stored in the event store 127. For example, the captured events 105 and/or actions 115 are stored as tables and the relationship between the captured events 105 and/or actions are also stored as tables. RDBMS 150 simplifies retrieval and subsequent use use of stored events for event processing analysis or use of stored events as input to an event processing simulation.

Figure 9:
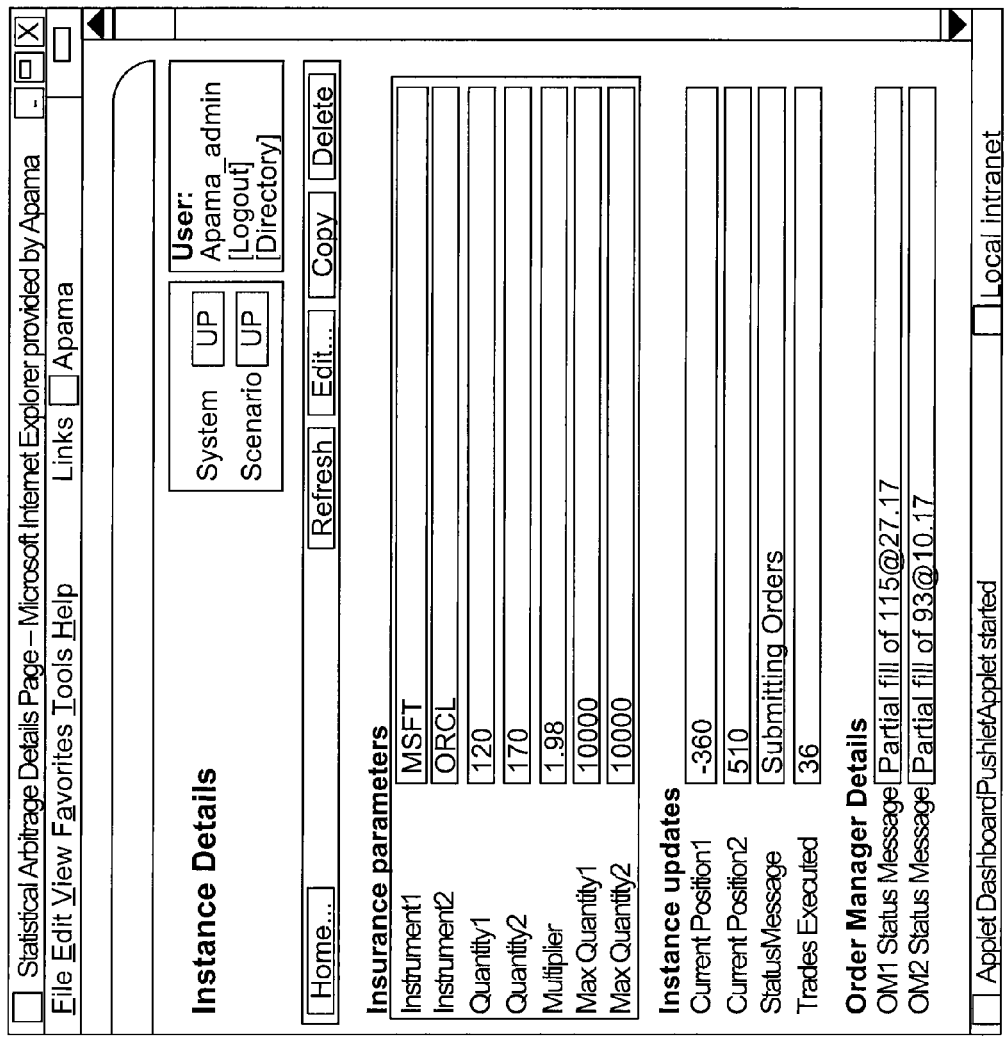
FIG. 9 is a graphical representation of an example dashboard generated by an event monitoring module for real time event visualization.

In one embodiment, the event engine 120 is also adapted to communicate with an event monitoring module 160. The event monitoring module 160 is any device or module configured to receive data describing event processing from the event engine 120 and to process the received data, such as by displaying the data or applying one or more event processing rules to the data. This allows real-time monitoring of event processing. For example, as the event engine 120 applies different rules to an event 105, the event engine 120 communicates the results of the rule application to the event monitoring module 160. In an embodiment, the event monitoring module 160 displays a visual representation of the event-based process or of the execution of the event-based process. This allows monitoring of the event-based process at a location remote from the event engine 120. For example, the event monitoring module 160 displays a graphical dashboard which visually illustrates data modified or generated during execution of the event-based process. In another embodiment, the graphical dashboard is interactive, allowing a user of the event monitoring module 160 to modify or generate events which are input to an event engine 120. A graphical representation of an example dashboard 900 generated by the event monitoring module 160 for real time visualization is shown in FIG. 9.

In one embodiment, the event monitoring module 160 comprises a cursor controller, a keyboard or keypad, a trackball, a stylus or other mechanism for communicating information and/or commands to the event engine 120. Alternatively, the event monitoring module 160 comprises a device including computing capabilities and data communication capabilities that communicates data capture or event processing simulation data to the event engine 120. Using one or more separate computing devices for the event monitoring module 160 allows the data capturing and/or simulation to occur at a location remote from the event engine 120.

In one embodiment, a network (not shown) is used to transmit data or instructions between or among the event engine 120, configuration module 130, event integration layer 140, event store 127, the RDBMS 150, the event monitoring module 160 and computing devices that provide input events 105 or receive actions 115. The network may comprise a conventional wireless data communication system, for example, general packet radio service (GPRS), IEEE 802.11 (or WiFi), IEEE 802.16 (or WiMax), Bluetooth, or any other suitable wireless communication system. Alternatively, the network may comprise a conventional wired data communication system, such as Ethernet, digital subscriber line (DSL), integrated services digital network (ISDN), or any other suitable wired communication system. In an embodiment, the network comprises a combination of a wireless communication system and a wired communication system. Alternatively, the network is replaced by a peer-to-peer configuration where the event engine 120, configuration module 130, event integration layer 140, event store 127 and event monitoring module 160 directly communicate with each other.

For purposes of illustration, FIG. 1 shows the configuration module 130, event engine 120, event integration layer 140, event store 127 and event monitoring module 160 as discrete modules. However, in various embodiments, the event engine 120, the configuration module 130, the event integration layer 140, event store 127 or the event monitoring module 160 can be combined in any number of ways. This allows a single module to perform the functions of one or more of the above-described modules.

Figure 2:
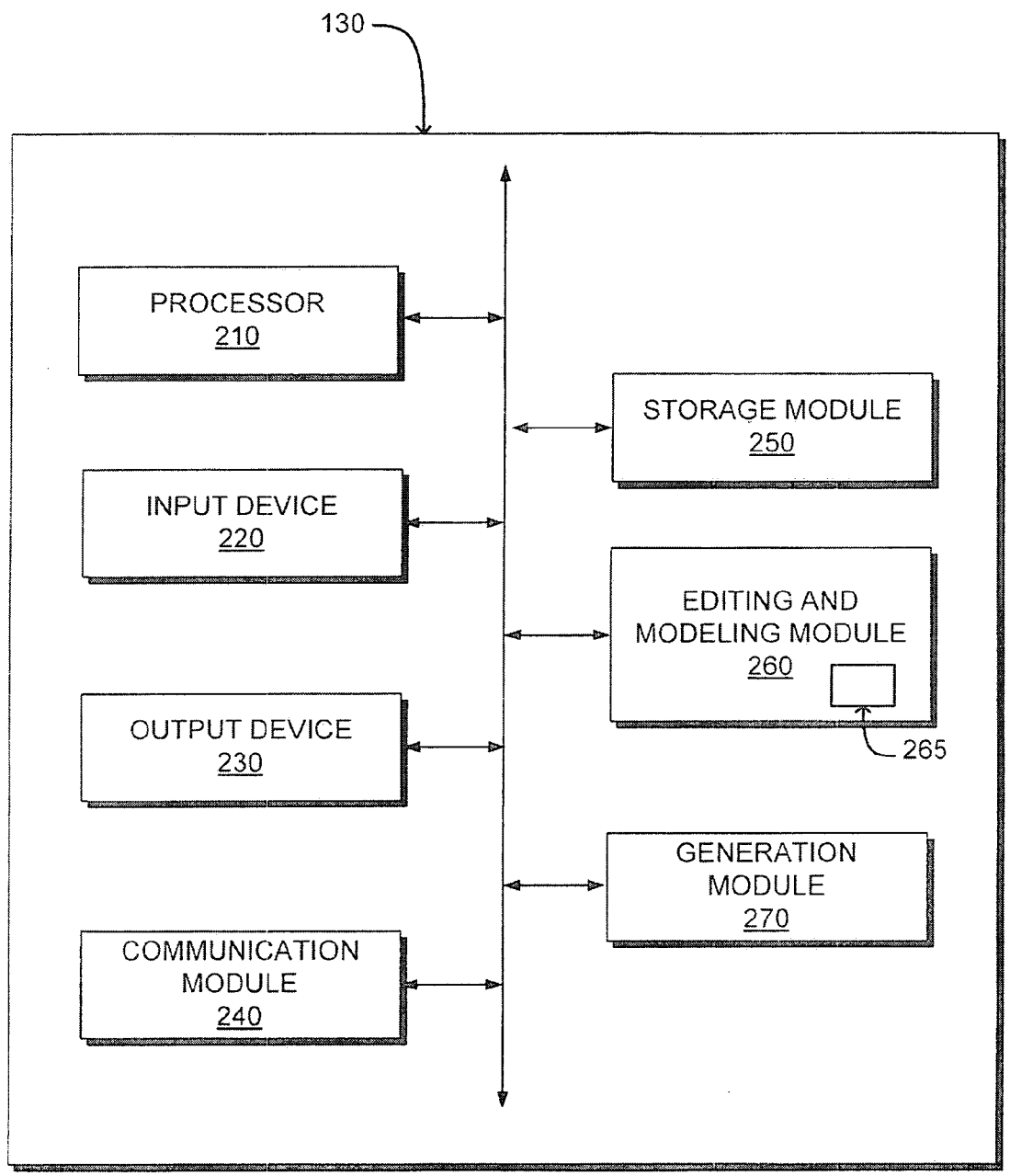
FIG. 2 is a block diagram of a configuration module for configuring an event-driven process according to one embodiment of the invention.

FIG. 2 is a block diagram of a configuration module 130 for an event-driven process according to one embodiment of the invention. The configuration module 130 comprises a processor 210, an input device 220, an output device 230, a storage module 250, a communication module 240, an editing and modeling module 260 and a generation module 270. Those of skill in the art will recognize that different embodiments can provide the functionality of FIG. 2 in different ways. Moreover, other embodiments can include different and/or additional features and/or components than the ones described here.

The processor 210 processes data signals and may comprise various computing architectures including a complex instruction set computer (CISC) architecture, a reduced instruction set (RISC) architecture or an architecture implementing a combination of instruction sets. Although only a single processor is shown in FIG. 2, multiple processors may be included. The processor 210 comprises an arithmetic logic unit, a microprocessor, a general purpose computer, or some other information appliance equipped to transmit, receive and process electronic data from the storage module 250, the communication module 240, the input device 220, the editing and modeling module 260, the generation module 270 or other components of the configuration module 130.

The input device 220 is any device configured to provide user input to the configuration module 130 such as a cursor controller or a keyboard. In one embodiment, the input device 220 comprises an alphanumeric device, such as a QWERTY keyboard, a key pad or representations of such created on a touch screen, adapted to communicate information and/or commands to the processor 210, the storage module 250, the editing and modeling module 260 or other components. In another embodiment, the input device 220 is a user input device equipped to communicate positional data as well as command selections to the processor 210 such as a joystick, a mouse, a trackball, a stylus, a pen, a touch screen, cursor direction keys or other mechanisms to cause movement adjustment of an image.

The output device 230 represents any device equipped to display electronic images and data as described herein. Output device 230 may be, for example, a light emitting diode (LED) display, liquid crystal display (LCD), cathode ray tube (CRT) display, or any other similarly equipped display device, screen or monitor. In one embodiment, output device 230 is equipped with a touch screen in which a touch-sensitive, transparent panel covers the screen of output device 230. The output device 230 displays data received from the editing and modeling module 260, the storage module 250, the processor 210, the communication module 240 or other components of the configuration module 130.

In an embodiment, the configuration module 130 further comprises a communication module 240 enabling the configuration module 130 to communicate with the event engine 120 and/or other devices. In an embodiment, the communication module 240 comprises a conventional wired connection, such as Ethernet, Universal Serial Bus (USB), or other wired communication techniques. In an alternate embodiment, the communication module 240 comprises a transceiver such as for infrared communication, Bluetooth communication, 3 G communication, radio frequency communication, or any other wireless communication technique. Alternatively, the communication module 240 comprises both a wired connection and a transceiver. The communication module 240 allows data, commands and/or information to be distributed using network protocols, such as Transmission Control Protocol (TCP), Internet Protocol (IP), Hypertext Transmission Protocol (HTTP), or other protocols capable of communicating data or information.

The storage module 250 stores data for use by the configuration module 130. The data for storage is received from the input device 220, the communication module 240, the editing and modeling module 260 or another suitable module. In various embodiments, the data for storage is entered or provided by a user, generated by a software process executing on the configuration module 130 or any other suitable manner of data acquisition. The storage module 250 comprises a hard disk drive, a flash memory device or other suitable persistent storage device. Further, the storage module 250 can be a volatile storage device (e.g., dynamic random access memory (DRAM), static random access memory (SRAM) or another suitable memory device), a non-volatile storage device or a combination of a non-volatile storage device and a volatile storage device.

The editing and modeling module 260 displays and/or generates a representation of an event-based process and/or receives input describing the event-based process or modifications to the event-based process from the storage module 250, the communication module 240, the input device 220 or from another suitable data source. In one embodiment, the editing and modeling module 260 receives data describing the states and state transitions of an event-based process, generates and displays a graphical representation of the states and state transitions of the event-based process from the received input. In one embodiment, the editing and modeling module 260 also receives data modifying or adding rules specifying the transition between states of the event-based process, process, and modifies an existing representation of the state transition rules or generates a new representation of the state transition rules.

The editing and modeling module 260 also includes a user interface module 265 that graphically displays data describing an event-based process to the user and receives input describing modifications to the event-based process from the user. The user interface module 265 generates a graphical modeling interface or environment, such as the one described below in conjunction with FIG. 6. The generated graphical modeling interface receives data describing an event-based process, such as input events, output actions, internal variables, process states, event processing rules and external components accessed or used by the event-based process. In one embodiment, the user interface module 265 and editing and modeling module 260 generate an event-driven model or process specifying input events, output actions, internal variables, states and/or rules responsive to the user input. Additionally, the graphical modeling interface allows users to select previously defined event-driven models or processes from the storage module 250 for use in an event-based process.

The user interface module 265 allows use of a graphical interface to generate an event-based process, rather than requiring a user to use a text programming language having multiple syntax rules, which simplifies generation of event-based processes. For example, the user interface module 265 and editing and modeling module 260 display a graphical state diagram describing various states in the event-based process and the transitions between those states. The graphical state diagram allows users to modify state transitions by selecting and moving a graphical representation of a state in the graphical state diagram or to add additional states by selecting a previously defined state and moving the previously defined state into the graphical state diagram. For example, a user selects a previously defined state from the storage module 250 and drags the selected state to the graphical state diagram and uses the graphical state diagram to specify the relationship between the added state and the existing states. In an embodiment, the user interface module 265 also displays a rule editor allowing a user to modify or create event processing rules specifying transitions between different states or generation of output actions.

The generation module 270 receives input from the editing and modeling module 260 describing the event-based process and generates executable code from the received input. For example, the generation module 270 generates an extensible markup language (XML) data structure, or other data structure having a structured format, including event programming language commands, or other data executable by the event engine 120, corresponding to the user input received by the editing and modeling module 260. An example data structure is described below in conjunction with FIG. 7. The generated data structure includes data in an event programming language or other format suitable for execution by the event engine 120 that corresponds to the graphical state diagram and/or pseudo code description of state transition rules received by the editing and modeling module 260. For example, the generation module 270 converts user input from the editing and modeling module 260 describing input events, output actions, states and rules into structured text-based event programming language commands or instructions by associating rules with states and transitions between states while applying one or more syntax rules. This allows the event-based process, or modifications to the event-based process, to be initially described in a first format, such as a graphical format or natural-language format, and then reformatted into an executable format, such as an event programming language, to simplify implementation by the event engine 120. This expedites creation or modification of an event-based process by using a simplified input format to describe the event-based process then automatically generating executable data from the simplified input to implement.

The editing and modeling module 260 and the generation module 270 can be implemented in many ways. For example, they can be one or more software processes executable by processor 210 and/or a firmware application. The software and/or firmware can be configured to operate on a general purpose microprocessor or controller, a field programmable gate array (FPGA), an application specific integrated circuit (ASIC) or a combination thereof. Alternatively, the editing and modeling module 260 and the generation module 270 comprise one or more processors configured to process data signals and may comprise various computing architectures including a complex instruction set computer (CISC) architecture, a reduced instruction set computer (RISC) architecture, or an architecture implementing a combination of instruction sets.

For purposes of illustration, FIG. 2 shows the editing and modeling module 260 and the generation module 270 as discrete modules. However, in various embodiments, the editing and modeling module 260 and the generation module 270 can be combined. This allows a single module to perform the functions of one or more of the above-described modules.

Figure 3:
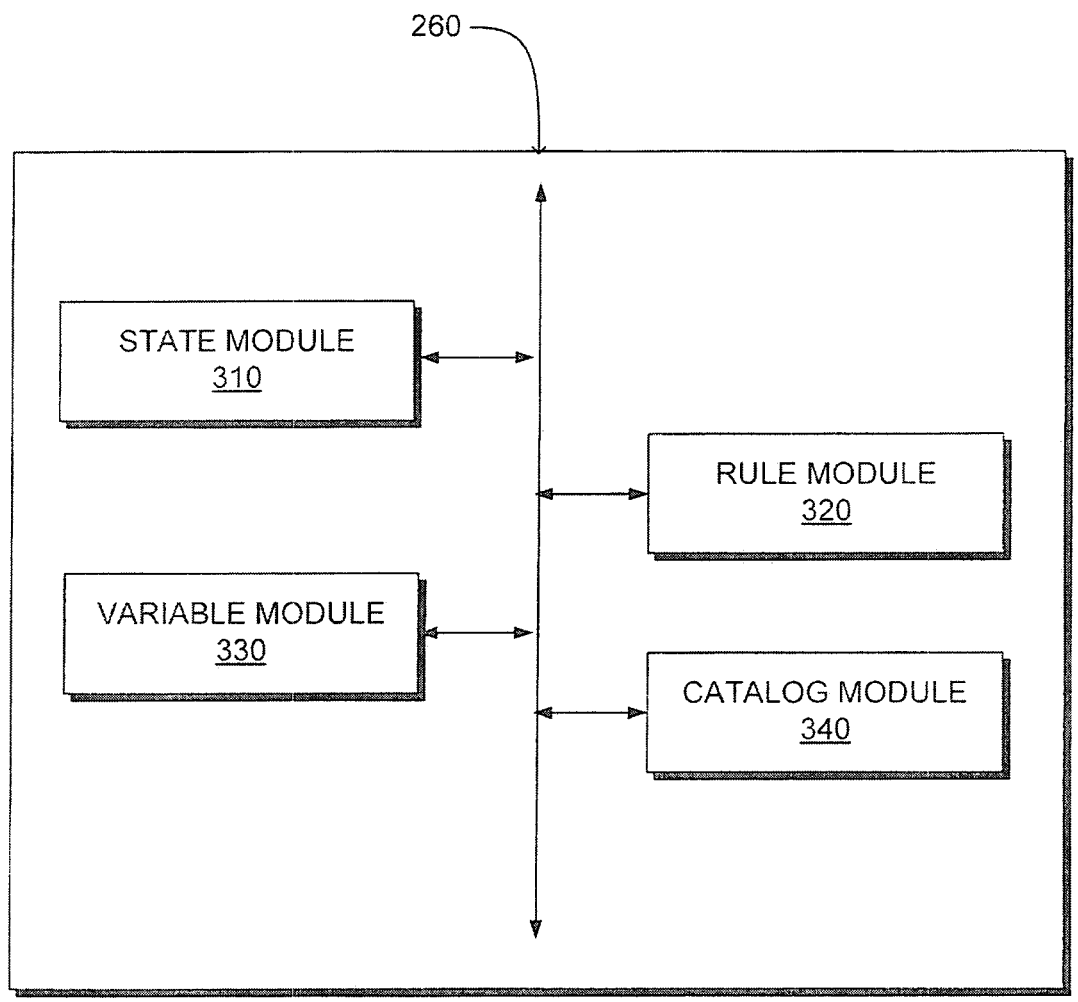
FIG. 3 is a block diagram of an editing and modeling module for generating or modifying an event-based process according to one embodiment of the invention.

FIG. 3 is a block diagram of an editing and modeling module 260 for generating or modifying an event-based process according to one embodiment of the invention. In one embodiment, the editing and modeling module 260 comprises a state module 310, a rule module 320, a variable module 330 and a catalog module 340. Those of skill in the art will recognize that different embodiments can provide the functionality of FIG. 3 in different ways. Moreover, other embodiments can include different and/or additional features and/or components than the ones described here.

The state module 310 includes data describing control information and path transitions comprising a single event-based process or a library of multiple event-based processes. In an embodiment, the state and/or state transition data is received from the input device 220, the storage module 250, the communication module 240, the rule module 320 or other modules and includes data describing the event-based process. The state module 310 modifies the states or the state transitions responsive to an input. The stored states include one or more data computations so the stored states modify data associated with received events to generate an output action. For example, different states modify different event data or perform different modifications of event data so that a different output action is generated responsive to the states which comprise the event-based process.

The rule module 320 includes data describing actions or comparisons performed on event data in different states of the event-based process and specifying when and/or under what conditions the event-based process transitions between states. For example, the rule module 320 stores one or more conditions specifying a comparison and one or more actions performed responsive to the comparison result. The one or more actions describe modifications to the event data or to the transitions between states. For example, the condition determines whether a data value exceeds a threshold and responsive to the condition evaluation the action modifies the data value. In an embodiment, the rule module 320 also stores comments (e.g., descriptive text strings or other descriptive data) describing various stored rules, such as a description of the event data used for comparison, a description of the action performed or a summary of the intended result to simplify subsequent identification and analysis of the rules. The rule module 320 receives data from the input device 220 and/or the storage module 250 and modifies the stored rules or comments responsive to the received input.

The variable module 330 identifies variable names, data associated with a variable name, the source and/or destination of data associated with a variable name and one or more properties associated with a variable name. The data associated with a variable name comprises received event data or data generated and output by one or more states of the event-based process. Hence, the variable module 330 includes information that the event-based process uses or modifies during processing and includes initialization data used to configure the event-based process when it initially receives an event. The variable module 330 also indicates the source of data for a variable name, such as a user input or input from a state in the event-based process, and/or the destination for data associated with a variable name, such as whether the data is displayed to a user or communicated to a state in the event-based process. In one embodiment, the variable module 330 also includes a variable type, such as text, number, Boolean, integer or other suitable data classification associated with a variable name. The variable type specifies specify how the data is stored and/or formatted. In another embodiment, the variable module 330 further categorizes stored data associated with a variable name, or a subset of the stored data associated with a variable name, as "input" or "output," to facilitate subsequent display and analysis of the event-based process. This allows the rules defined by the editing and modeling module 260 to be abstracted into a format applicable to multiple events. Additionally, the variable module 330 indicates whether data associated with a variable name can be modified by a user, whether data associated with a variable name cannot be modified by a user, whether data associated with a variable name can only be modified by a user in specific circumstances (e.g., upon initialization of the event-based process) or constraints on the data associated with a variable name (e.g., minimum or maximum length, minimum or maximum value. The variable module 330 receives input from the rule module 320, state module 310 and/or input module 220 and modifies stored data (e.g., deletes stored data, stores new data, modifies stored data or other similar data modification) responsive to the received input.

The catalog module 340 stores one or more preconfigured modules, or "blocks" for use by the event-based process. The stored blocks accept input, perform one or more computations and generate output, allowing the event-based process to include one or more predefined groups of actions in an event-based process. In an embodiment, the catalog module 340 groups the stored blocks into categories, such as blocks having similar functionality or similar user-specified classifications, to facilitate retrieval and implementation of the blocks. In another embodiment, the catalog module 340 also prevents modification of a subset of the stored blocks, so that certain blocks consistently perform the same groups of actions while allowing certain blocks to be customized responsive to different implementations. The catalog module 340 communicates with the state module 310 and/or the input device 220 to receive input selecting a block for use by the event-based process, specifying modification to a stored block or specifying a new block to be stored. In one embodiment, the catalog module 340 retrieves stored blocks from the storage module 250. Alternatively, the catalog module 340 includes a volatile storage device, a non-volatile storage device or a combination of a volatile storage device and non-volatile storage device for locally storing blocks.

The state module 310, the rule module 320, the variable module 330 and/or the catalog module 340 can be implemented in many ways. For example, they can be one or more software processes executable by processor 210 and/or a firmware application. The software and/or firmware can be configured to operate on a general purpose microprocessor or controller, a field programmable gate array (FPGA), an application specific integrated circuit (ASIC) or a combination thereof. Alternatively, the state module 310, the rule module 320, the variable module 330 and/or the catalog module 340 comprise one or more processors configured to process data signals and may comprise various computing architectures including a complex instruction set computer (CISC) architecture, a reduced instruction set computer (RISC) architecture, or an architecture implementing a combination of instruction sets.

For purposes of illustration, FIG. 3 shows the state module 310, the rule module 320, the variable module 330 and the catalog module 340 as discrete modules. However, in various embodiments, any or all the state module 310, the rule module 320, the variable module 330 and/or the catalog module 340 can be combined. This allows a single module to perform the functions of one or more of the above-described modules.

System Operation

Figure 4:
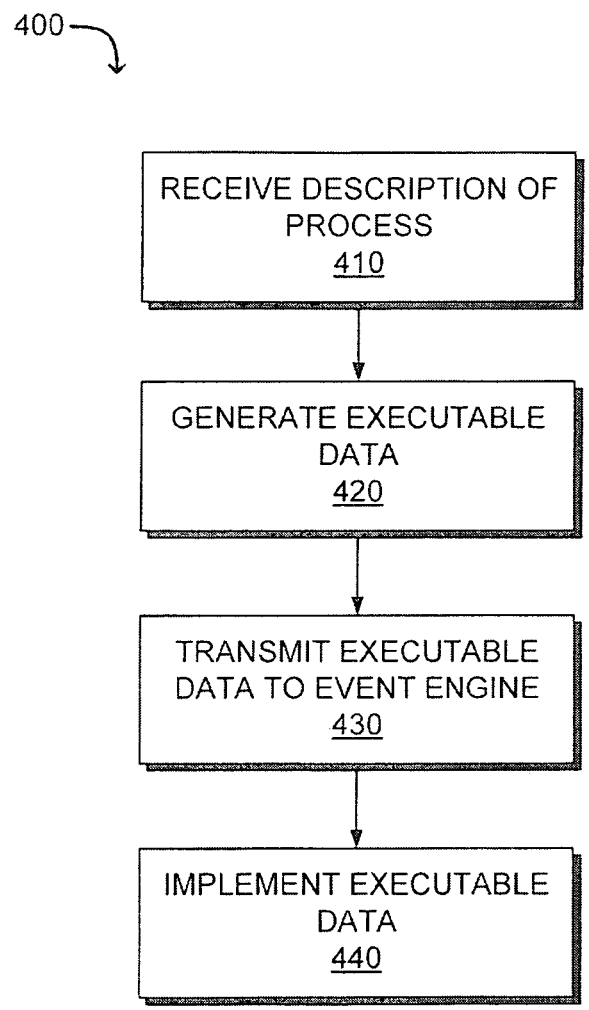
FIG. 4 is a flow chart of a method for configuring an event-driven process according to one embodiment of the invention.

FIG. 4 is a flow chart of a method 400 for configuring an event-driven process according to one embodiment of the invention. Those of skill in the art will recognize that other embodiments can perform the steps of FIG. 4 in different orders or include different and/or additional steps than the ones described herein.

Initially, a description of the event-based process is received 410 by the editing module 230. In one embodiment, the received description comprises a graphical representation of the event-based process describing states and state transitions of the event-based process. Alternatively, the received description comprises a graphical representation of modifications to an event-based process.

Executable data is then generated 420 from the description of the event-based process. In one embodiment, generation 420 comprises converting the received description into an event programming language for execution by an event engine 120. For example, one or more syntax rules are applied to the received description to generate data having an executable format (e.g., formatted as an event programming language or other format suitable for execution) from the received description. This simplifies modification of an event-based process by allowing input to be provided in a simplified or intuitive format which is then automatically converted into executable data compliant with syntax or formatting requirements.

The generated executable code is then transmitted 430 by the communication module 240 to the event engine 120 for implementation 440. The configuration module 130 transmits a data packet including the executable data and an event-based process identifier to the event engine 120. The transmitted data packet also specifies the input events, corresponding output actions, states and state transition rules comprising the event-based process. In one embodiment, the transmitted data packet includes an instance creation command. The instance creation command specifies a set of information needed to create an additional instance of the event-based process and allows the event engine 120 to create additional event-based processes that accept different events as input using creation values specified by the transmitted data packet.

For example, variables identified in the transmitted data packet are designated as creation variables and specify default values used by a new event-based process.

Alternatively, the transmitted data packet includes data describing modifications to state variables or state transition rules of an existing event-based process. In one embodiment, the generated executable code is transmitted 430 to a plurality of event engines 120, allowing the configuration module 130 to modify or configure an event-based process used by multiple event engines 120. For example, the configuration module 130 transmits a data packet including an event-based process identifier and modifications to the event-based process to multiple event engines 120. If an event engine 120 implements 440 the event-based process identified by the data packet, the event-based process is updated responsive to the contents of the data packet, if an event engine 120 does not implement the identified event-based process, the data packet is discarded. Alternatively, user input at the configuration module 130 selects one or more event engines 120 and the data packet including the event-based process identifier and event-based process modifications is transmitted to the selected event engines. In another embodiment, event engines 120 periodically transmit data identifying an event-based process to the configuration module 130 which determines if the identified event-based process has been modified then transmits modified data to the event engines 120 if necessary. Hence, a configuration module 130 configures and/or manages event-based processes executed by event engines 120 in multiple locations. Under any of the above scenarios, the method completes with the event engine 120 executing or implementing 440 the generated executable code. Once the event-based process is implemented on the event engine 120, a received event is processed using the event-based process.

Figure 5:
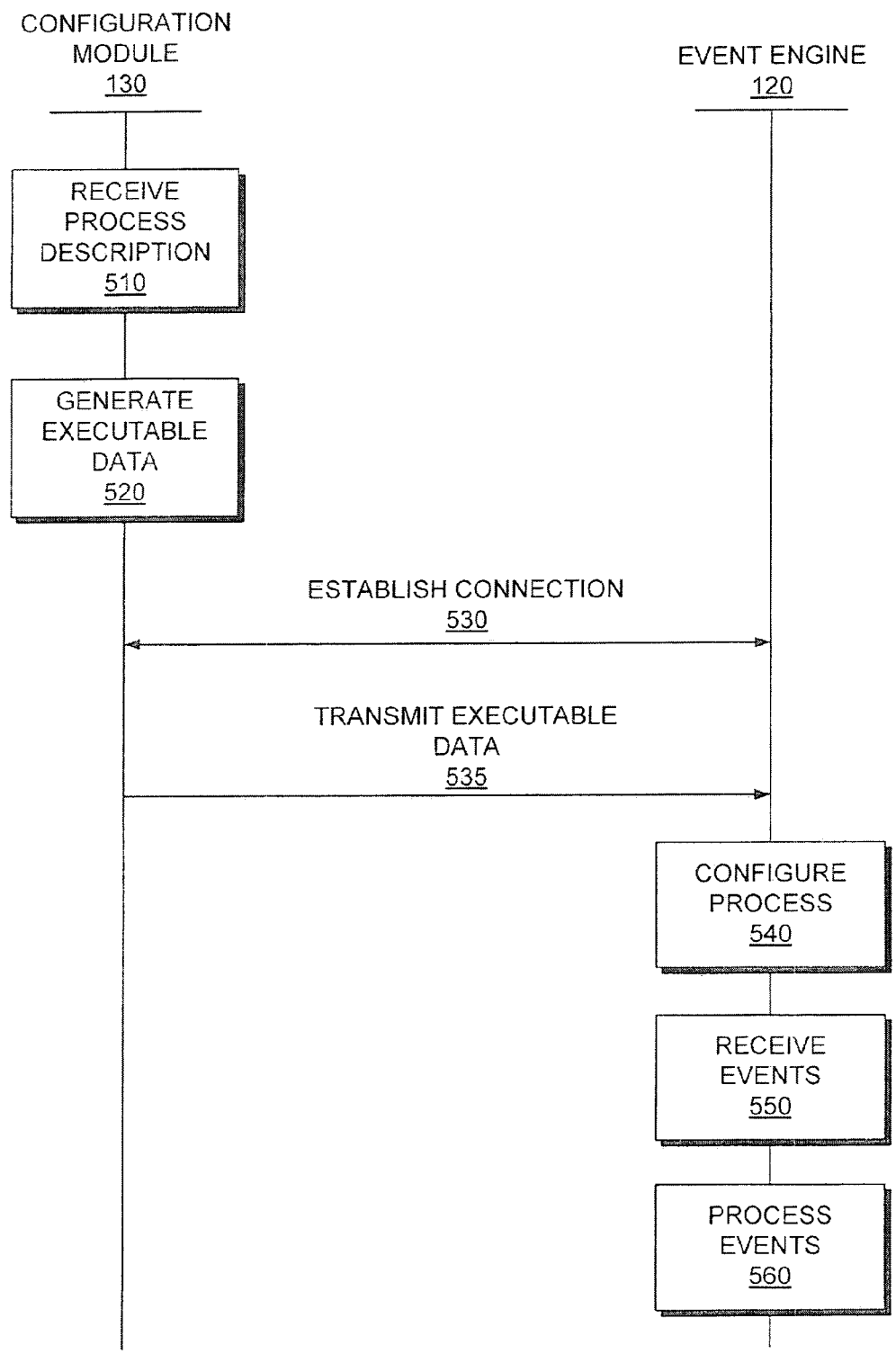
FIG. 5 is a trace diagram of event-driven process configuration in a distributed computer system according to one embodiment of the invention.

FIG. 5 is a trace diagram of event-driven process configuration in a distributed computer system according to one embodiment of the invention.

The configuration module 130 first receives 510 a description of the event-based process. For example, the configuration module 130 receives 510 a graphical depiction of the event-based process, such as a state transition diagram including rules for transitioning between states. This allows description of an event-based process using a simple graphical interface depicting relationships between different states rather than using a text-based programming language having multiple syntax requirements. The configuration module 130 then generates 520 executable data from the event-based process description. Hence, the configuration module 130 allows executable data for implementing the event-based process to be generated from a simplified description of the event-based process. This simplifies configuration and modification of event-based processes.

A connection, such as a data connection, is then established 530 between the configuration module 130 and the event engine 120. In one embodiment, the configuration module 130 and event engine 120 reside at remote locations. This allows a configuration module 130 to modify or configure event-based processes operating on multiple event engines 120. The generated executable data is then transmitted 535 from the configuration module 130 to the event engine 120 using the established connection. The event engine 120 then configures 540 the event-based process using the executable data. For example, the event engine 120 generates a new event-based process or modifies an existing event-based process (e.g., alters existing state transition rules, creates additional state transition rules, adds execution operations to existing states, removes execution operations from existing states or similar modifications) responsive to the received executable data. This allows the event engine 120 to efficiently modify or configure the event-based process upon receiving data from the configuration module 130 rather than requiring additional data processing or formatting by the event engine 120.

After configuring 540 the event-based process, the event engine 120 receives 550 events from one or more computing devices and processes 560 the received events using the reconfigured event-based process.

Figure 8:
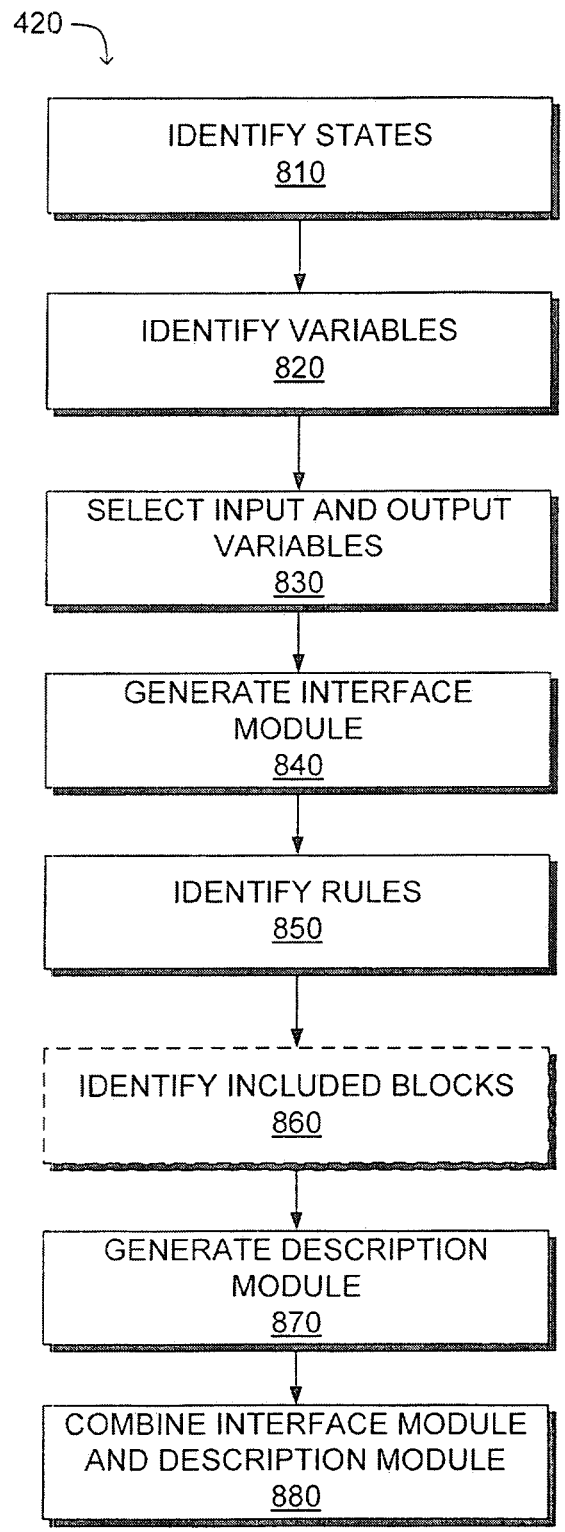
FIG. 8 is a flow chart of a method for generating executable data for configuring an event-driven process according to one embodiment of the invention.

FIG. 8 is a flow chart of a method for generating executable data for configuring an event-driven process according to one embodiment of the invention.

Initially, the configuration module 130 identifies 810 states of the event-based process. The graphical modeling interface includes a text-based description corresponding to the displayed graphical representation of the event-based process states. Similarly, the graphical modeling interface includes a text description of the variables used by the event-based process which is used to identify 820 the variables used in the event-based process. Although a graphical modeling interface is used to display the states, variables and relationship between the states of the event-based process as well as the event processing rules, a corresponding text description of the event-based process is stored in the storage module 250 of the configuration module 130. This stored text description is used to identify 810 the states and to identify 820 the variables of the event-based process.

After identifying 820 the event-based process variables, input and output variables are selected 830 and used to generate 840 an interface module. Because variables identified 820 as input or output are received from or transmitted to a user or another event-based process, these input or output variables are selected 830 and included in an interface module of the data packet transmitted to the event engine 120. This generates an abstraction over the underlying rules and states held within the rule store 125. The interface module describes the events acted upon and the actions produced by an event-based process. Additionally, the interface module also includes an event-based process identifier specifying the event-based process described or configured by the data packet. Therefore, the interface module is accessed by other event-based processes and identifies the event-based process and the input received and output produced by the event-based process.

Rules describing actions or comparisons applied to events and specifying the state transitions between event-based process states are then identified 850 from data associated with the graphical modeling interface. In one embodiment, blocks corresponding to predefined groups of actions in an event-based process are then identified 860. The identified blocks allow previously defined or configured actions of groups of actions to be included in an event-based process. After identifying 850 rules and identifying blocks 860, if any, the states, variables, rules and blocks are used to generate 870 a description module.

As the description module includes the states, variables, rules and blocks used by the event-based process, the description module includes the states of the event-based process, the rules and events that cause the event-based process to transition between states, variables used by the various states and any blocks used by the event-based process. In one embodiment, the description module comprises an extensible markup language (XML) schema describing the states of the event-based process, the relationship between states from the rules and the variables used by the states. The description module and interface module are then combined 880 to generate the data packet that is communicated from configuration module 130 to event engine 120. An example data packet is further described below in conjunction with FIG. 7. This allows data creating or modifying an event-based process to be generated from a graphical representation of the event-based process and communicated to an event engine 120 for implementation using a data packet having a standardized format, simplifying creation and modification of an event-based process.

Those of skill in the art will recognize that in various embodiments one or more of the methods described in FIG. 4, FIG. 5 and FIG. 8 are implemented in hardware and/or software or combinations thereof. For example, instructions for performing one or more of the above-described methods are embodied or stored within a computer readable medium.

User Interface

FIG. 6 is an example user interface for event-based process configuration according to one embodiment of the invention. Those of skill in the art will recognize that different embodiments can provide the information and functionality of FIG. 6 in different ways. Moreover, other embodiments can include different and/or additional features and/or layouts than the ones described here.

A state modification region 610 allows a user to create, modify or delete states and/or state transitions which comprise an event-based process and also provides a graphical depiction of the relationship between states and/or state transitions. For example, the state modification region 610 visually differentiates the states comprising the event-based process, such as by using one or more geometrical shapes to identify different states and by using arrows or other directional indicators to represent transitions between states and the flow of event data between states. The state modification region 610 allows a user to add additional states, delete existing states, modify existing states or modify relationships between states by interacting with the graphical depiction of the event-based process states and/or state transitions. For example, a user alters the state transitions by redirecting the arrows between states.

A rule editing region 620 displays rules specifying actions performed on event data by different states and when to transition between states. In an embodiment, the rule editing region 620 visually distinguishes between components of a rule, such as condition, action and comment by using different icons or different colors or other visual distinctions to denote the different components of the rule. The rule editing region 620 receives input from a user or software process describing rule conditions, rule actions or comments and creates, modifies or deletes rules accordingly.

The variable listing 630 displays event data used to generate an output action associated with an input event. The displayed variables store event data used, modified or created by the event-based process. The variable listing 630 also displays variable type, such as text, number, choice, Boolean or other suitable data type to indicate the format and content of the variables. In one embodiment, the variable listing 630 does not initially display variable type, but displays variable type responsive to an input command. Additionally, the variable listing 630 also indicates whether a variable is an input or output variable, such as by providing check boxes associated with both input variable and output variable. This generates an abstraction based upon the selected input and output variables.

A catalog listing 640 displays one or more preconfigured modules, or "blocks," for insertion into the event-based process. The blocks accept input, perform one or more computations and generate output. In one embodiment, the catalog listing 640 displays blocks in a hierarchical fashion, such as by grouping blocks which perform similar functions or have similar user-specified classifications into displayed categories. Received input then allows examination of the blocks included in a category. In one embodiment, a block can be inserted into the event-based process by dragging an icon, or similar representation of a block, associated with the block into a state displayed in the state modification region 610.

A block display 650 displays one or more blocks currently used by the event-based process. In one embodiment, the block display 650 displays the blocks according to the state, or states, implementing the block. For example, the block display 650 is partitioned partitioned into multiple regions each associated with a state and displays in each region the block, or blocks, used by the corresponding state. In an embodiment, an icon or similar representation of a block can be dragged from the catalog listing 640 to the block display 650 to insert the selected block into a state.

Example Data Structure

Figure 7:
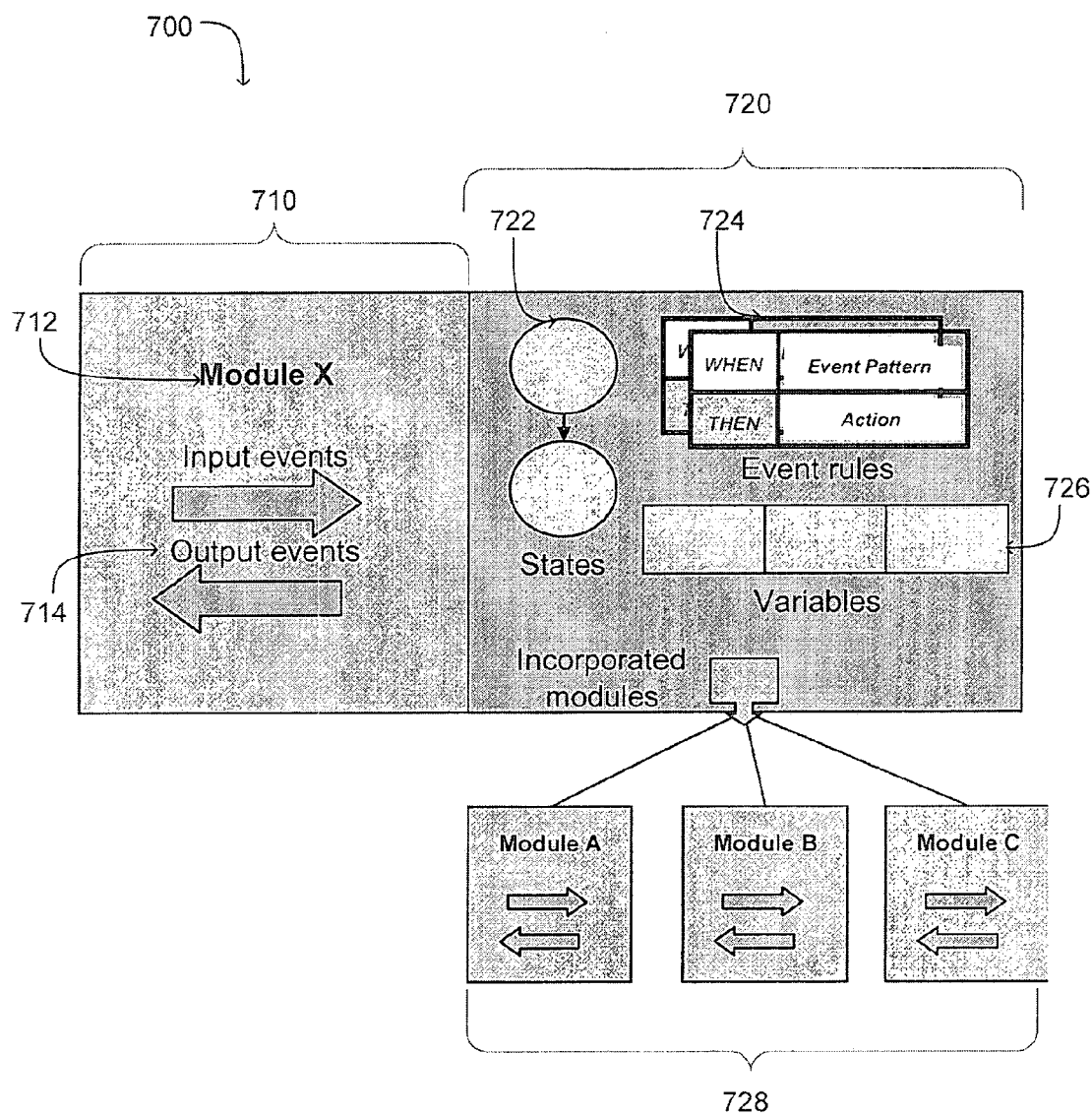
FIG. 7 is an example data structure for communicating data to configure an event-driven process according to one embodiment of the invention.

FIG. 7 is an example data structure 700 for communicating data to configure an event-driven process according to one embodiment of the invention. Those of skill in the art will recognize that different embodiments can provide the information and functionality of FIG. 7 in different ways. Moreover, other embodiments can include different and/or additional features and/or layouts than the ones described here.

The data structure 700 includes an interface module 710 and a description module 720. The interface module 710 includes an event-process identifier component 712 and an input-output component 714. The event process identifier component 712 uniquely identifies an event-based process associated with the data structure 700. For example, the event process identifier component 712 comprises an alphanumeric string associated with an event-based process, allowing different data structures 700 to identify different event-based processes. The input-output component 714 identifies input events received by the identified event-based process and output actions generated by the identified event-based process. Thus, the input-output component 714 identifies what events are acted on by the event-based process and what actions are generated by the event-based process. In one embodiment, the interface module 710 is accessible by other event-based processes for identification of the events used and actions generated by the event-based process described by the data structure 700.

The description module 720 includes a state identification component 722, a rule identification component 724, a variable identification component 726 and a block identification component 728. The state identification component 722 includes structured data describing one or more states of the event-based process. The rule identification component 724 includes data describing the relationship between states of the event-based process and transitions between event-based process states. Similarly, the variable identification component 726 includes data describing variable names and data associated with the variable names used by one or more states. For example, the description module 720 is an XML schema where the rules identification component 724 specifies the relationship between states of the event-based process and the variable identification component 726 identifies data types and values used by the different states. However, use of XML is merely an example format structure and in other embodiments, any suitable type of structured data format can be used.

Additionally, the block identification component 728 identifies or describes one or more additional predefined groups of actions in an event-based process used by the identified event-based process. In one embodiment, the block identification component 728 includes an event-based processor identifier associated with another event-based process and data describing how events are processed by the combination of event-based processes. Alternatively, the block identification component 728 includes data for implementing another event-based process or a subset of an event-based process.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for configuring an event-based process by a user, the system comprising:
    a user interface system running on one or more microprocessors for generating a user interface for a user, the user interface being configured to allow the user to build a graphical representation of the event-based process using graphical representations of states and state transitions, wherein the user can select a previously-defined state and add it to the graphical representation of the event-based process and use the graphical representation of the event-based process to specify a relationship between the added state and existing states;
    a configuration system running on the one or more microprocessors for receiving the graphical representation of the event-based process and for generating executable data describing the event-based process from the graphical representation;
    wherein generating includes converting at least a portion of the graphical representation of the event-based process into an event programming language;
    an event engine running on the one or more microprocessors, adapted to communicate with the configuration system, for receiving the executable data describing the event-based process and for executing the event-based process from the received executable data; and
    an event monitoring system running on the one or more microprocessors, adapted to communicate with the event engine, for displaying a visual representation of the event-based process during execution.

2. The system of claim 1, wherein the event monitoring system is remote from the event engine.

3. The system of claim 1 comprising an event integration layer running on the one or more microprocessors, adapted to communicate with the event engine, for transmitting data between the event engine and a computing device.

4. The system of claim 1 wherein the user interface system is configured to display data describing the event-based process in a graphical modeling interface environment.

5. The system of claim 1, wherein the executable data comprises an event programming language representing the received input.

6. The system of claim 1, wherein the visual representation comprises a graphical dashboard.

7. An apparatus for configuring an event-based process, the apparatus comprising:
    a processor-based editing system for receiving input from a user comprising a graphical description of the event-based process, the graphical description including graphical representations of states and state transitions of the event-based process, wherein the user can select a previously-defined state and add it to the graphical description of the event-based process and use the graphical description of the event-based process to specify a relationship between the added state and existing states;
    a processor-based generation system, adapted to communicate with the editing system, for generating executable data describing the event-based process described by the received input;
    wherein generating includes converting at least a portion of the received input into an event programming language; and
    a storage system, adapted to communicate with the generation system, for storing the generated executable data describing the event-based process.

8. The apparatus of claim 7 comprising: a user interface system for displaying data describing the event-based process in a graphical modeling interface environment, the user interface system coupled for communication with the editing system.

9. The apparatus of claim 7, wherein the editing system comprises: a state system for modifying at least one of the states of the event-based process.

10. The apparatus of claim 7, wherein the editing system comprises: a rules system for generating one or more rules describing at least one of the state transitions of the event-based process.

11. The apparatus of claim 7, wherein the editing system comprises: a variable system for storing and modifying a variable used by the event-based process.

12. The apparatus of claim 7, wherein the editing system comprises: a catalog system for storing a previously defined event-based process.

13. The apparatus of claim 7, wherein the executable data describing the event-based process comprises an event programming language representing the received input.

14. A method for configuring an event-based process, the method comprising:
    receiving user input comprising a graphical description of the event-based process, wherein the graphical description includes graphical representations of states and state transitions of the event-based process, wherein the user can select a previously-defined state and add it to the graphical description of the event-based process and use the graphical description of the event-based process to specify a relationship between the added state and existing states;

generating executable data representing the event-based process using the received user input;

wherein generating includes converting at least a portion of the received input into an event programming language; and generating the event-based process by executing the generated executable data.

15. The method of claim 14 comprising: displaying, at a remote location, monitoring data describing execution of the event-based process.

16. The method of claim 15, wherein the monitoring data describing execution of the event-based process comprises a graphical dashboard.

17. The method of claim 14, wherein generating the event-based process comprises:

transmitting the executable data to an event processing engine;

generating the event-based process by implementing the executable data; and processing a received event using the event-based process.

18. The method of claim 14, wherein generating executable data representing the event-based process comprises: generating data formatted in an event processing language, the generated data corresponding to the received input.

19. The method of claim 14, wherein generating executable data representing the event-based process comprises: associating the received input with a previously generated event-based process.

20. The method of claim 14, wherein the received input includes a modification to the event-based process.

21. A method for remote configuration of an event-based process, the method comprising:

receiving input from a user describing the event-based process, the user input including graphical representations of states and state transitions of the event-based process, wherein the user can select a previously-defined state and add it to the graphical representations of the states and the state transitions of the event-based process and use the graphical representations of the states and the state transitions of the event-based process to specify a relationship between the added state and existing states;

responsive to receiving user input, generating executable data associated with the event-based process;

wherein generating includes converting at least a portion of the received user input into an event programming language;

generating a data packet including the generated executable data and an event-based process identifier; and transmitting the data packet.

22. The method of claim 21, wherein generating the data packet comprises:

identifying an event-based process state from the received input; and generating state data in a structured format describing the event-based process state.

23. The method of claim 22, wherein generating the data packet comprises:

identifying an event processing rule describing a transition between event-based process states from the received input; and generating rule data in a structured format describing the identified event processing rule, wherein the rule data in the structured format is associated with the state data in the structured format.

24. The method of claim 22, wherein generating the data packet comprises:

identifying a variable used in the event-based process state from the received input; and generating variable data in a structured format describing the identified variable, wherein the variable data in the structured format is associated with the state data in a structured format.

25. The method of claim 21, wherein generating the data packet comprises:

identifying an input variable describing an event received by the event-based process;

identifying an output variable describing an action generated by the event-based process; and generating an interface module including the event-based process identifier, the input variable and the output variable.

26. The method of claim 21, wherein generating the data packet comprises:

generating an interface module including the event-based process identifier and a variable;

generating a description module including at least one of the states of the event-based process, and a rule; and combining the interface module and the description module.

* * * * *